United States Patent

[11] 3,577,929

[72] Inventors Yoshimitsu Onoda;
 Hisakatsu Kiwaki, Katsuta-shi, Japan
[21] Appl. No. 774,052
[22] Filed Nov. 7, 1968
[45] Patented May 11, 1971
[73] Assignee Hitachi, Ltd.
 Tokyo, Japan
[32] Priority Nov. 10, 1967
[33] Japan
[31] 42/71991

[54] ELECTRIC VEHICLE DRIVING AND CONTROLLING APPARATUS
8 Claims, 33 Drawing Figs.
[52] U.S. Cl. .................................................. 104/148(LM), 318/35
[51] Int. Cl. ........................................................ B60l 13/00
[50] Field of Search ............................................. 318/227; 104/148; 318/112, 135, 137, 35

[56] References Cited
UNITED STATES PATENTS
3,233,559  2/1966  Smith et al. ............ 104/148(LM)(UX)
3,320,506  5/1967  Humphrey ................ 318/227X

*Primary Examiner*—Arthur L. La Point
*Assistant Examiner*—George H. Libman
*Attorney*—Craig & Antonelli

ABSTRACT: An electric vehicle driving and controlling apparatus, wherein during the low-speed operation, single-phase AC power is supplied to a synchronous motor type rotary machine through a thyristor group to thereby control the rotation of said rotary machine, and during the ultra-high-speed operation, three-phase AC power available at the armature terminals of said rotary machine is also applied to a linear motor to thereby accelerate the latter.

INVENTORS
YOSHIHITSU ONODA
HISAKATSU KIWAKI

BY Craig & Antonelli
ATTORNEYS

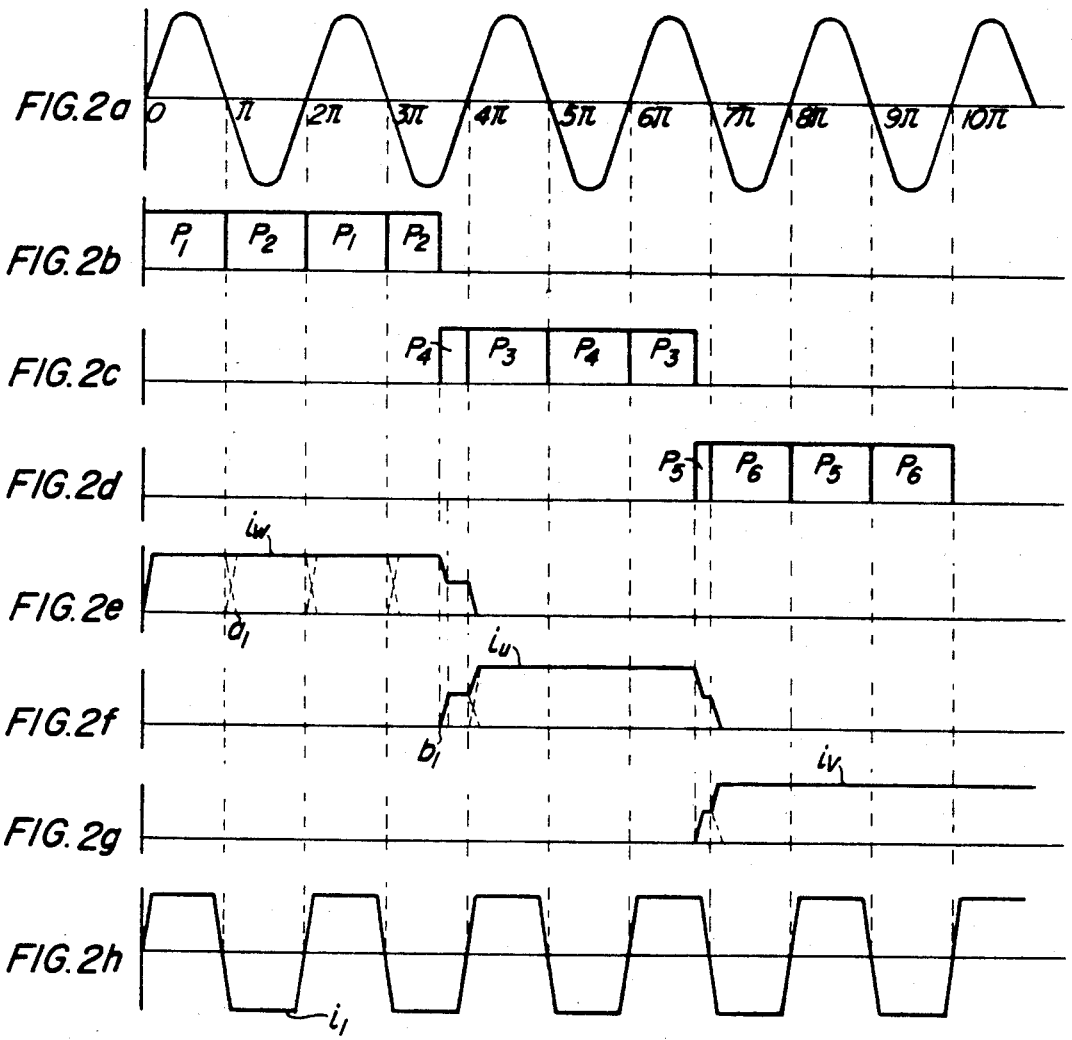

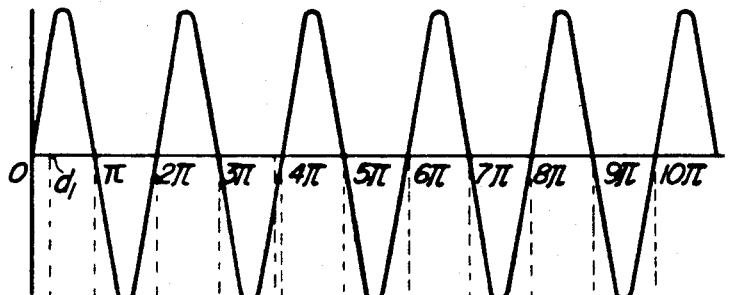
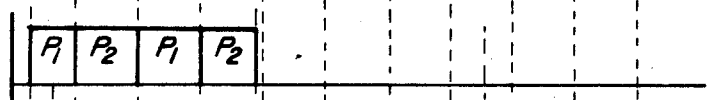
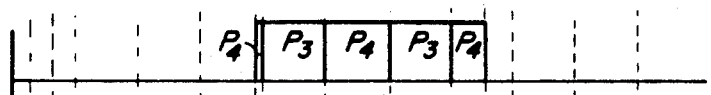
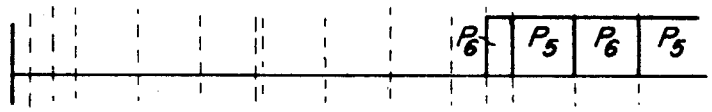
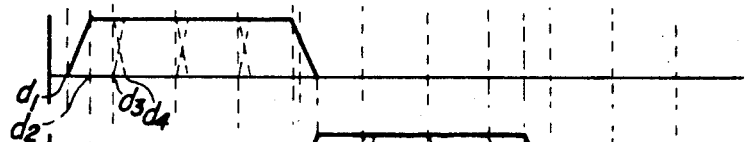
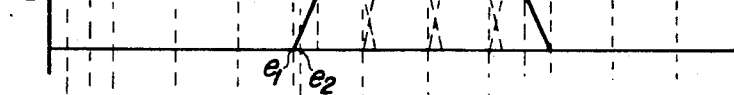
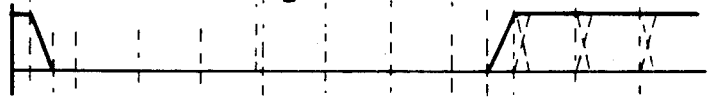
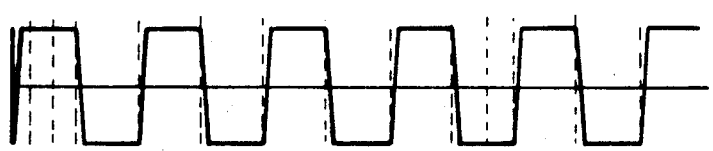

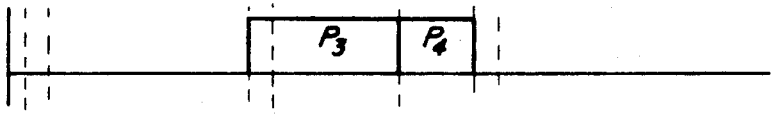
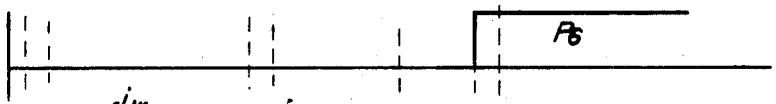
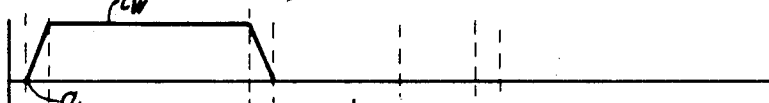
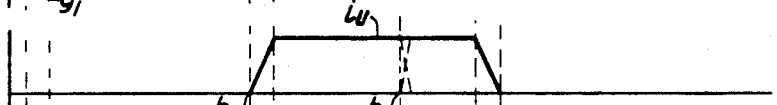
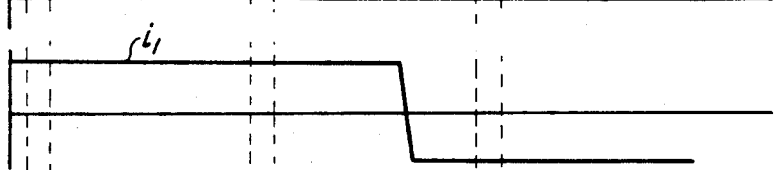
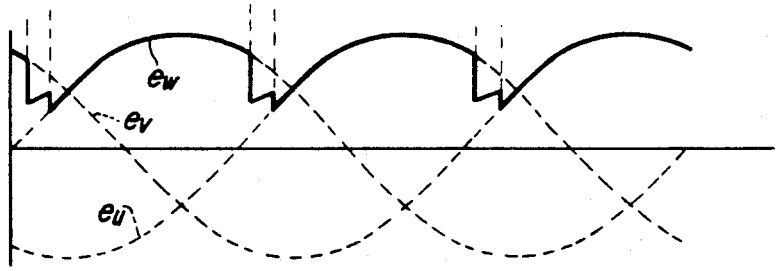

ELECTRIC VEHICLE DRIVING AND CONTROLLING APPARATUS

BACKGROUND OF THE INVENTION

1. Field of the Invention

This invention relates to an electric vehicle driving and controlling apparatus, more particularly it pertains to such apparatus for ultra-high speed which uses an adhesion type drive system and a nonadhesion-type drive system in combination.

2. Description of the Prior Art

Generally, in an electric vehicle driving apparatus, use is made of a system in which drive wheels are rotated by means of a rotary machine such as a DC motor, induction motor, a commutator motor or the like. Such system is called adhesion type drive system since adhesion occurring between the drive wheels and rails is utilized. With this system, however, it is considered that the highest possible speed is about 250 km./h. The reason is that when the vehicle speed exceeds 250 km./h., the travelling resistance (mainly, air resistance) is rapidly increased so that the coefficient of adhesion between the drive wheels and the rails is reduced in spite of rapid increase of power required for acceleration, thus making the acceleration impossible.

In an attempt to realize a system capable of acceleration up to ultra-high speed, therefore, there has been proposed a system in which use is made of a linear motor instead of a rotary machine. This system is referred to as nonadhesion drive system wherein a torque is produced directly by magnetic flux occurring between the transportation rails or separately provided drive rails and the linear motor. In such system, the power-factor and efficiency of the linear motor at a low speed are low, and a multiphase AC power source is required to generate a shifting magnetic field.

In actuality, however, power which can be supplied to an electric car is limited to either single-phase AC power or DC power. This is natural on the basis of the fact that a single power transmission line is used in order to reduce the expenses for ground installation and simplify the current collector. Therefore, it is essential that a single-phase AC power to multiphase AC power converter with a considerably high capacity be provided on the vehicle. Furthermore, in view of the techniques involved and the cost of the installation, such system is considered to be difficult to be put to practical use, even if the power-factor and efficiency of the linear motor at low speed are not considered.

SUMMARY OF THE INVENTION

It is a primary object of the present invention to provide a driving apparatus capable of stably driving an electric vehicle from a low speed to a ultra-high speed.

Another object of the present invention is to provide a driving apparatus wherein during the low-speed operation, use is made of an adhesion type system constituted by a rotary machine which is advantageously efficient and during the high-speed operation, either said adhesion type system is used in combination with a nonadhesion-type drive system constituted by a linear motor, or only the latter system is used, thereby effectively achieving acceleration.

Still another object of the present invention is to provide a driving apparatus wherein single-phase AC power or DC power is supplied to an electric vehicle by the use of a single trolley wire and current collector, and yet there is no need to provide any single-phase AC power (DC power) to a multiphase AC power converter for supplying multiphase AC power to the linear motor during the high-speed operation.

A further object of the present invention is to provide a control apparatus wherein during the ultra-high-speed operation, a leading current is caused to flow through a rotary machine to thereby compensate for lagging current produced by a linear motor.

Other objects, features and advantages of the present invention will become apparent from the following description taken in conjunction with the accompanying drawings.

BRIEF DESCRIPTION OF THE DRAWINGS

FIGS. 2a—2h are views useful for explaining the starting and very low speed operations;

FIGS. 3a—3k are views useful for explaining the operation as the speed of revolution is lower than the synchronous speed;

FIGS. 4a—4k are views useful for explaining the operation as the speed of revolution is higher than the synchronous speed.

DESCRIPTION OF THE PREFERRED EMBODIMENTS

Figure 1:
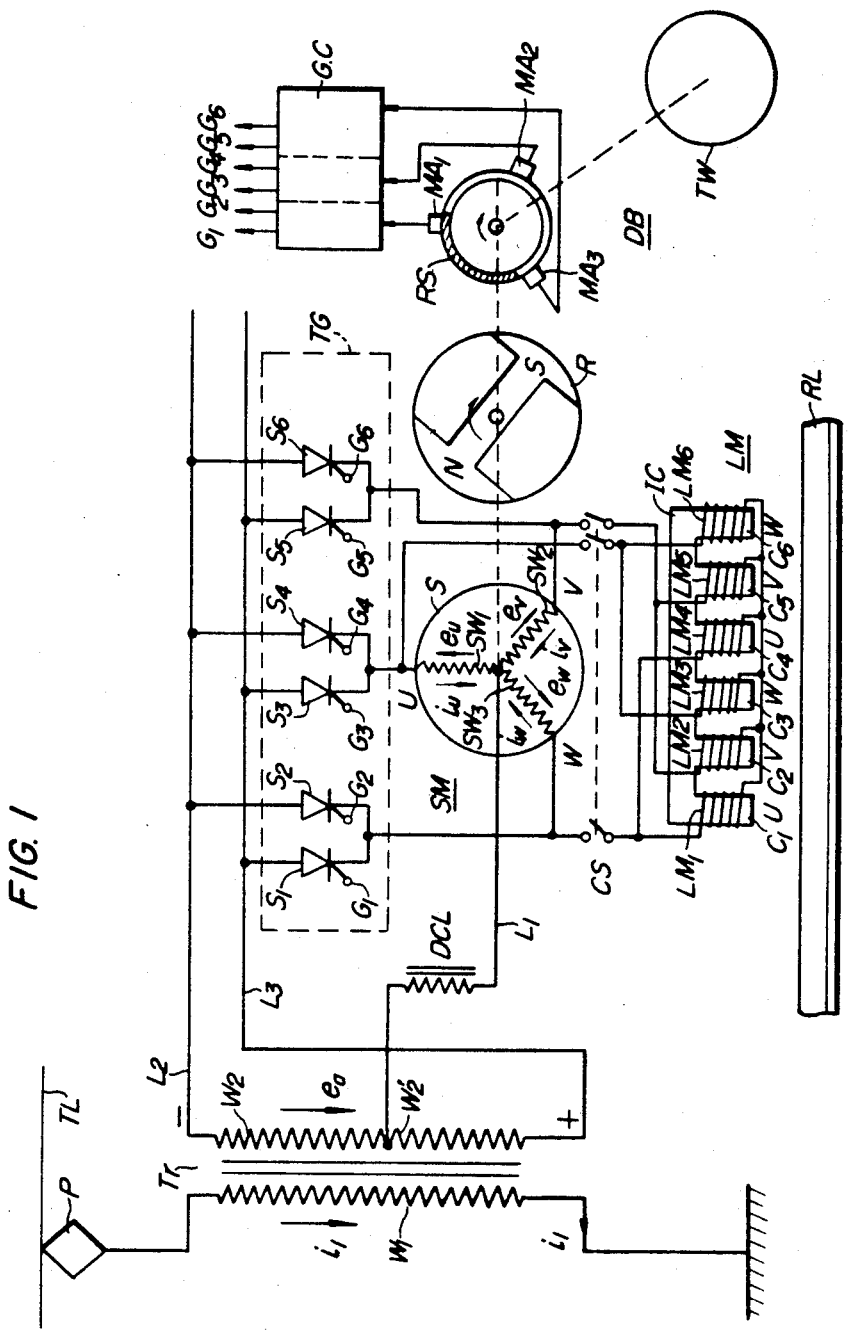
FIG. 1 is a diagram showing the electric vehicle driving and controlling apparatus according to an embodiment of the present invention.

Referring to FIG. 1, there is provided a main transformer $Tr$ having a primary winding $W_1$ and secondary windings $W_2$ and $W'_2$, the primary winding $W_1$ being connected through a pantagraph P with a trolly wire TL to which a single-phase AC power is applied. Drive wheels TW are driven and controlled by means of a synchronous motor type rotary machine SM comprising a stator S, rotor R and distributor DB. The stator S has armature windings $SW_1$, $SW_2$ and $SW_3$ wound thereon which are connected with each other in the form of three-phase Y-connection the neutral point of which is connected with the center tap of the main transformer $Tr$ through a neutral line $L_1$. A smoothing reactor DCL is inserted in the neutral line $L_1$. Input terminals U, V and W of the stator windings $SW_1$, $SW_2$ and $SW_3$ are connected with output lines $L_2$ and $L_3$ of the main transformer $Tr$ through a thyristor group or controlled switching circuit TG. That is, the stator winding $SW_3$ is coupled to the output lines $L_3$ and $L_2$ through thyristors $S_1$ and $S_2$, the stator winding $SW_1$ to the output lines $L_3$ and $L_2$ through thyristors $S_3$ and $S_4$, and stator winding $SW_2$ to the output lines $L_3$ and $L_2$ through thyristors $S_5$ and $S_6$. A linear motor LM comprises a magnetic core IC provided with six legs $C_1$ to $C_6$, and three-phase windings $LM_1$ to $LM_6$ wound on said legs $C_1$ to $C_6$ respectively. These three-phase windings are connected with each other in the form of Y-connection and coupled to the input terminals U, V and W of the stator S through switches CS. When supplied with three-phase AC power, the linear motor LM is enabled to produce a torque between itself and a rail RL so as to serve as nonadhesion system.

The rotor R is shown as a permanent magnet, but in practice it is provided with a field winding as is the case with a revolving-field type synchronous machine, and energized by a DC power source through a slip ring. In the foregoing description, a revolving-field type synchronous machine having the stator with armature windings is used. But it will be quite apparent that a revolving-armature type synchronous machine can also be employed.

The distributor DB includes a rotary segment RS connected directly with the rotor R for rotation with the latter, and approach (detecting) switches $MA_1$, $MA_2$ and $MA_3$ arranged in predetermined spaced relationship with each other. The distributor is adapted to produce a signal corresponding to a relative position of the rotor with respect to the stator, and therefore besides the illustrated one, various types such as one wherein use is made of voltages produced in the stator windings $SW_1$, $SW_2$ and $SW_3$, one wherein the rotor position is photoelectrically detected, and so forth are well known in the art.

The approach switch $MA_1$ is turned on when it is opposed to the rotary segment RS, so that a signal is supplied to a gate control device GC which provides an output at a terminal $G_1$ when the polarity of the DC power source is as shown in the drawing and at a terminal $G_2$ when it is reversed. Such a gate control device is essentially the same as a grid control device employed in a thyratron motor which is well known in the art and any type may be used.

For example, a gate control device may take the form similar to the mechanical switching element disclosed in U.S. Pat. No. 3,229,179. Of course, the power source of the motor in this patent is a DC power source, and, therefore, the gate signal of the thyristor corresponds to the relative positions of the stator and the rotor. In the present invention, however, since the power source employed in an AC power source, a gate signal must by synchronized with a source voltage as is well known to those skilled in the art.

Another example of a circuit arrangement which may be employed to generate a gate control signal is disclosed in U.S. Pat. No. 3,320,506.

The examples of gate control circuits disclosed in the above-mentioned patents are merely illustrative of the types of gate control circuits which may be employed as such circuits are well known to those of skill in the art and a detailed description thereof is unnecessary. Thus, ignition pulses $P_1$ and $P_2$ are imparted to the thyristors $S_1$ and $S_2$ respectively. Similarly, the thyristors $S_3$ to $S_6$ are controlled by the approach switches $MA_2$ and $MA_3$.

In the above example, when the rotor R is stopped at the illustrated position, the approach switch $MA_1$ is operated by the rotary segment RS of the distributor DB so as to provide an output so that an input signal is supplied to the gate control device GC. Assume that such an AC voltage as shown in FIG. 2a is produced at the secondary side of the main transformer Tr; then, in the secondary windings $w_1$ and $W_2$ there are developed voltages of which the polarities are as shown in the drawing during the voltage period from 0 to $\pi$.

Thus, the gate control device GC provides ignition pulse $P_1$ at an output terminal $G_1$, whereby the thyristor $S_1$ is rendered conductive. Consequently, a current flows through a network $W_2' \rightarrow S_1 \rightarrow SW_3 \rightarrow DCL \rightarrow W_2'$ to energize the stator winding $SW_3$. Upon reversal of the power source polarity, the thyristor $S_1$ is automatically rendered nonconductive at a point of time $a_1$ after the commutation period, and at this time the gate control device GC provides the ignition pulse $P_2$ at an output terminal $G_2$, whereby the thyristor $S_2$ is rendered conductive. Consequently, a current flows in such a path as $W_2 \rightarrow S_2 \rightarrow SW_3 \rightarrow DCL \rightarrow W_2$ to energize the stator winding $SW_3$ in the same direction as here above. Such condition will be maintained as long as the approach switch $MA_1$ is in the operating state (see FIG. 2e).

On the other hand, since the rotor R is magnetized in such a direction as shown in the drawing, attracting and repelling forces act between the stator winding $SW_3$ and the rotor R so that the latter is rotated clockwise. With the rotation of the rotor R, the distributor DB is also rotated so that the rotary segment RS is moved from a position corresponding to the approach switch $MA_1$ to a position to operate the switch $MA_2$. Although the thyristor $S_2$ is in the conducting state at a point $b_1$ (see FIG. 2f), the thyristor $S_4$ is also rendered conductive by the action of the distributor DB, thus resulting in the two thyristors being conducting. Upon reversal of the power source polarity at a phase angle of $4\pi$, the gate control device GC provides an ignition pulse $P_3$ at an output terminal $G_3$, whereby the thyristor $S_3$ is rendered conductive so that a current flows in such a direction as $W_2' \rightarrow S_3 \rightarrow SW_1 \rightarrow DCL \rightarrow W_2'$. When the polarity of the power source voltage is reversed, the gate control device GC produces an ignition pulse $P_4$ at an output terminal $G_4$, whereby the thyristor $S_4$ is rendered conductive so that a current flows through a circuit $W_2 \rightarrow S_4 \rightarrow SW_1 \rightarrow DCL \rightarrow W_2$ to energize the stator winding $SW_1$ in the same direction as here above. Consequently, the rotor R is made to produce a rotational force by a magnetic field produced by the stator winding $SW_1$ so that the rotor is enabled to continue the clockwise rotation. With further rotation of the rotor R, the rotary segment RS of the distributor DB is displaced to a position to actuate the approach switch $MA_3$. Thus, for the polarity as shown in the drawing, the thyristor $S_5$ is rendered conductive, and for the reverse polarity, the thyristor $S_6$ is turned on, so that the stator winding $SW_2$ is energized, in the same manner as described above.

As already mentioned above, the respective thyristors are turned off upon reversal of the power source polarity after the ignition pulses provided by the gate control device GC have become extinct.

Thus, the distributor DB controls the gate control device GC through the rotation of the rotor R to sequentially energize the stator windings $SW_3$, $SW_1$, $SW_2$, $SW_3$ in the order indicated so that there is produced in the stator S a kind of revolving magnetic field which becomes faster with increase of the rotational frequency of the rotor. The time intervals at which the thyristors $S_1$ to $S_6$ are fired by means of the distributor DB and gate control device GC, become shorter with an increase of the rotational frequency of the rotor R, thus resulting in a further increase of the rotational frequency of the rotor R. On the other hand, a counter electromotive force is produced in the stator windings $SW_1$ to $SW_3$ by linkage of the magnetic flux produced by the rotor, so that the rotational frequency of the rotor settles down at a point of time when the counter electromotive force and input voltage are brought substantially in equilibrium with each other, as is the case with the control of a DC motor.

FIGS. 2a—2h are views useful for explaining the operation of the arrangement shown in FIG. 1, wherein the output voltage $e_a$ across the secondary winding of the main transformer Tr is shown at FIG. 2a, with polarity shown in FIG. 1 being positive. Ignition pulses applied to the respective thyristors by the gate control device GC are shown at FIG. 2b, FIGS. 2c and FIG. 2d respectively, the currents flowing through the stator windings $SW_3$, $SW_1$ and $SW_2$ are indicated at FIG. 2e, FIG. 2f and FIG. 2g respectively, and a current $i_1$ flowing through the primary winding of the main transformer is shown at FIG. 2h. In order to simplify the illustration, it is assumed that the smoothing reactor DCL has an infinite impedance, and that a DC current without any ripple flows through the secondary winding.

Figure 3I:
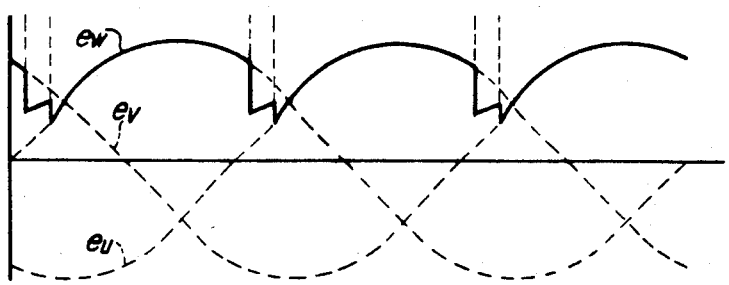

Furthermore, a counter electromotive force occurring in each of the stator windings $SW_1$ to $SW_3$ is neglected on the assumption that the rotational frequency of the rotor R is low. However, it is quite apparent that if the rotational frequency is increased, such a three-phase AC current as shown by a dotted line in FIG. 3i is caused to flow through the stator windings $SW_1$ to $SW_3$ by the fact that these windings link the magnetic flux produced by the rotor R. Assume now that the rotor R is rotated clockwise as viewed in the drawing to the position shown in FIG. 1 ($d_1$ in FIG. 3e). Then, the approach switch $MA_1$ is operated by the rotary segment RS of the distributor DB so that ignition pulse $P_1$ is imparted to the thyristor $S_1$ as shown in FIG. 3b. As will be apparent also from the description of FIGS. 2a—2h the thyristor $S_5$ is rendered conductive during the period 0 to $d_1$ as shown in FIG. 2g so that a current flows through a circuit $S_5 \rightarrow SW_2 \rightarrow DCL \rightarrow W_2' \rightarrow S_5$. When the thristor $S_1$ is turned on, due to the difference between counter electromotive forces $e_w$ and $e_r$ (see FIG. 3i) occurring in the stator windings $SW_3$ and $SW_2$, or $e_r - e_w$, a commutation current is caused to flow through a closed circuit $S_1 \rightarrow SW_3 \rightarrow SW_2 \rightarrow S_5 \rightarrow S_1$ so that the thyristor $S_5$ is forced to effect commutation by a resulting counter electromotive force. The period $d_1 - d_2$ during which the commutation is effected is referred to as commutation period.

Figure 3J:
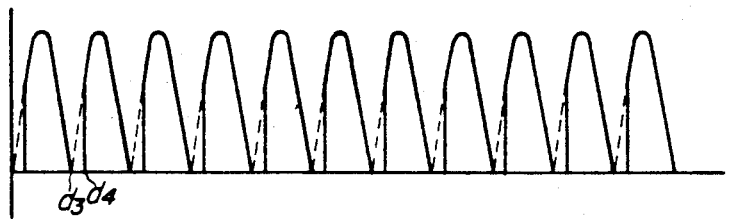

Subsequently, the power source voltage is reversed at a phase angle of $\pi$ so as to be of the opposite polarity to that shown in FIG. 1. Thereupon, an ignition pulse $P_2$ is imparted from the gate control device GC to the thyristor $S_2$. The thyristor $S_1$ cannot be rendered nonconductive concurrently with the polarity reversal, but a predetermined period $d_3 - d_4$ is required therefor. During the time, the power source is short-circuited by the two thyristors so that zero-section occurs in the output voltage $e_d$ of the thyristors as shown in FIG. 3j. Since the commutation is effected at every half-cycle of the power source, the output voltage of the thyristor group becomes as shown in FIG. 3j.

When the rotary segment RS is turned to the position to operate the approach switch $MA_2$ by the further rotation of the rotor R an ignition pulse $P_4$ is imparted from the gate control device GC to the thyristor $S_4$ (see point $e_1$ in FIG. 3b).

During the period $3\pi$—$e_1$, the thyristor $S_2$ is turned on so that a current flows through a closed circuit $S_2 \rightarrow SW_3 \rightarrow DCL \rightarrow W_2 \rightarrow S_2$.

Upon conduction of the thyristor $S_4$, a commutation current is caused to flow through a circuit $S_4 \rightarrow SW_1 \rightarrow SW_3 \rightarrow S_2 \rightarrow S_4$ by the voltage difference between counter electromotive forces $e_w$ and $e_r$ produced in the stator windings $SW_3$ and $SW_1$, or $e_r - e_w$ (see FIG. 3i). Thus, the thyristor $S_2$ is forced to effect commutation.

Upon reversal of the power source polarity, the thyristor $S_4$ is turned off. The point of time when the thyristor $S_3$ is rendered conductive is as described above.

By further rotation of the rotor R the approach switch $MA_3$ is operated so that the thyristors $S_5$ and $S_6$ are repeatedly turned on and off.

As described above, with the rotation of the rotor R, the distributor DB controls the ignition of the thyristor group TG in the following order of $S_1 \rightarrow S_2 \rightarrow S_3 \rightarrow S_4 \rightarrow S_5 \rightarrow S_6 \rightarrow S_1$. The commutations from $S_1$ to $S_2$, from $S_3$ to $S_4$, and from $S_5$ to $S_6$ are effected through the reversal of the power source polarity. On the other hand, the commutation from one phase to another phase or from the thyristors $S_1$, $S_2$, $S_3$, $S_4$, $S_5$ and $S_6$ to $S_3$, $S_4$, $S_5$, $S_6$, $S_1$, $S_2$ is effected by the counter electromotive forces $e_u$, $e_r$ and $e_w$ occurring the stator windings $SW_1$, $SW_2$ and $SW_3$ of the stator.

Figure 3K:
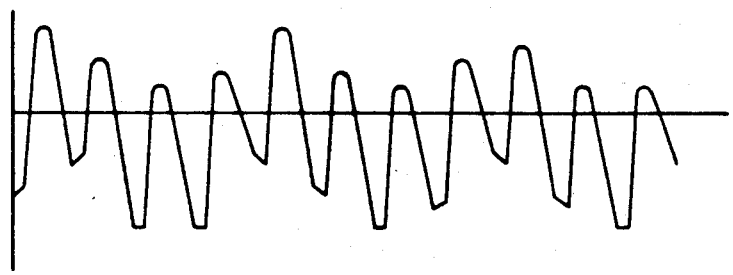

Since the smoothing reactor DCL is inserted in the neutral line $L_1$, such a three-phase current as shown by a dotted line in FIG. 3i always occurs at each of the terminals U, V, W of the stator, and the difference between the output voltage of the thyristor group TG and the counter electromotive forces is absorbed by the smoothing reactor DCL. Thus, the voltage across the smoothing reactor DCL turns out to be as shown in FIG. 3k. The zero-voltage period during which the power source polarity is reversed corresponds to the commutation period during which the thyristor is turned off. (Refer to the description concerning the period $d_3$—$d_4$ in FIG. 3e).

Figure 4A:
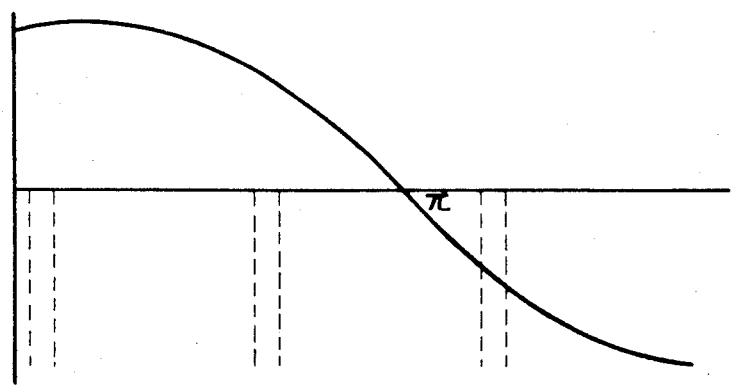
Figure 4J:
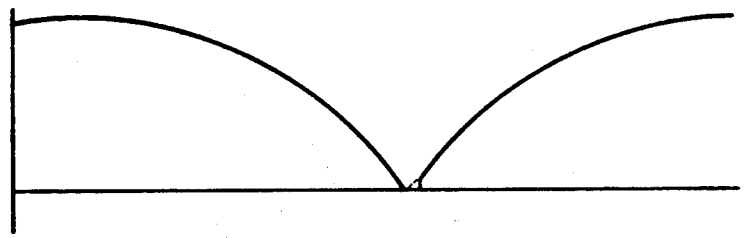
Figure 4K:
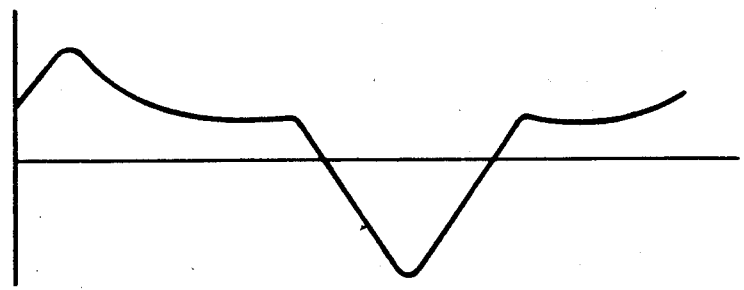

FIGS. 2a—2h and 3a—3k illustrate the starting and high-speed operations wherein it is assumed that the frequency of the counter electromotive forces $e_u \sim e_w$ is lower than the frequency of the power source. If, however, the speed of rotation of the rotor becomes higher than the synchronous speed, then the frequency of the counter electromotive forces $e_u$, $e_r$, $e_w$ becomes higher than the frequency of the power source, as shown in FIGS. 4a and 4i. In FIGS. 4a—4k, the power source frequency is shown as being lower than that in FIGS. 2a—2h and 3a—3k and the frequency of the counter electromotive forces as being equal to that in FIGS. 2 and 3, for the convenience of illustration.

Assume now that the rotor R is located at the position shown in FIG. 1 at a phase angle $d_1$. Then, the thyristor $S_1$ is rendered conductive, as described above. During the period 0—$g_1$, the thyristor $S_5$ is in the conducting state. However, a commutation current is caused to flow by the difference $e_r$—$e_w$ between the V-phase and W-phase counter electromotive forces upon conduction of the thyristor $S_1$, so that the thyristor $S_5$ is turned off, as described above in connection with FIGS. 3a—3ka.

The approach switch $MA_2$ is operated by the rotation of the rotor R but the power source polarity is not changed. At this time, therefore, the thyristor $S_3$ is rendered conductive. Thus, commutation from the thyristor $S_1$ to $S_3$ is effected in accordance with a principle similar to that of the commutation from the thyristor $S_5$ to $S_1$ (see a point $h_1$ in FIG. 4f).

When a phase angle $h_2$ is reached, the polarity of the power source is reversed so that commutation from the thyristor $S_3$ to $S_4$ is effected. Further, when the approach switch $MA_3$ is operated, commutation from the thyristor $S_4$ to $S_6$ is effected.

That is, for a period during which the power source polarity is positive, commutation is effected in the following order $S_1 \rightarrow S_3 \rightarrow S_5 \rightarrow S_1$ by the counter electromotive forces, while for a period during which the power source polarity is negative, commutation is effected in the following order $S_2 \rightarrow S_4 \rightarrow S_6 \rightarrow S_2$. When the power source polarity is reversed, commutation is effected between $S_1$ and $S_2$, between $S_3$ and $S_4$, and between $S_5$ and $S_6$.

Due to the action of the smoothing reactor DCL inserted at the neutral point, the terminal voltages of the rotary machine become three-phase AC voltages substantially equal to the counter electromotive forces. The differences between the output voltages of the thyristor group and the counter electromotive forces are absorbed by the smoothing reactor DCL, so that the burden voltage of the smoothing reactor becomes as shown in FIG. 3k.

As will be seen from what has been described above, the rotation of the rotary machine is controlled with respect to the starting point, low speed, high speed and ultra-high speed, and at the stator terminals U, V, W thereof there occurs a three-phase AC voltage of which the frequency increases with an increase of the rotational frequency of the rotor.

It is also possible that the speed control of the rotary machine may be achieved by controlling the output voltage of the main transformer, phase of the thyristor group, current flowing through the field winding, or position of the distributor.

In order to drive an electric vehicle from the stationary state to the ultra-high-speed state by the use of the aforementioned electric vehicle driving and controlling apparatus, the switch CS is first opened to disconnect the linear motor LM. Subsequently, the power source is turned on so that the rotary machine is operated in accordance with the aforementioned operational principle. The speed of the rotary machine SM is gradually increased, and sufficient acceleration cannot be effected when a speed of about 200 km./h. is reached.

Figure 5:
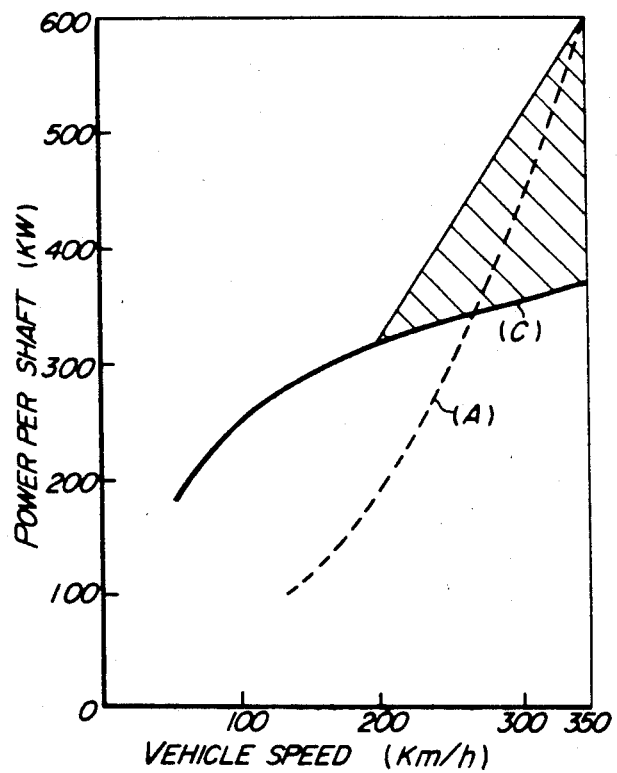

FIG. 5 is a graph useful for explaining this, wherein the vehicle speed is indicated on the horizontal axis and power per shaft on the vertical axis. Curve A shows the required power for the case of a flat ground surface. Power which can be transmitted by an adhesion drive system is shown at C. From this, it will be seen that the power required for acceleration cannot be produced when the speed is increased up to about 250 km./h.

In accordance with the present invention, therefore, the switch CS is turned on for acceleration up to the ultra-high speed. As mentioned above, three-phase AC voltages $e_u$, $e_r$ and $e_w$ such as shown by the broken lines in FIG. 3i and FIG. 4i are obtained at the terminals U, V and W of the synchronous motor type rotary machine SM, respectively. Thus, upon the closure of the switch CS, a three-phase AC current is supplied to the linear motor, with a result that a moving magnetic field is produced in the iron core IC with the aid of the windings $LM_1$ to $LM_4$. Consequently, nonadhesion acceleration torque occurs between the linear motor LM and the rail RL, whereby the vehicle is accelerated, as is well known in the art.

That is, at the ultra-high speed, power of such a magnitude as shown at C in FIG. 5 is provided by the synchronous motor type rotary machine serving as adhesion type drive system, and the remainder shown by the oblique lines is produced by the linear motor serving as nonadhesion-type drive system.

Conveniently, the linear motor is enabled to produce attractive force irrespective of the fact that the coefficient of friction is decreased in the ultra-high-speed range, since the linear motor serves as nonadhesion-type drive system.

The speed in the ultra-high-speed range depends upon the driving torque produced by the linear motor, and the driving torque depends upon the frequency of a supplied three-phase AC current. That is, by controlling the rotational frequency of the rotary machine by the aforementioned means even at the ultra-high speed, the frequency of a three-phase AC voltage occurring at the stator can be continuously changed so that the speed control can be effected with respect to the vehicle.

By further increasing the field current for the rotary machine SM during the ultra-high-speed operation, the rotary machine SM is enabled to produce a leading current so as to serve as a synchronous condenser. Thus, the overall load efficiency can be remarkably increased even if a lagging current flows through the linear motor LM.

Figure 6:
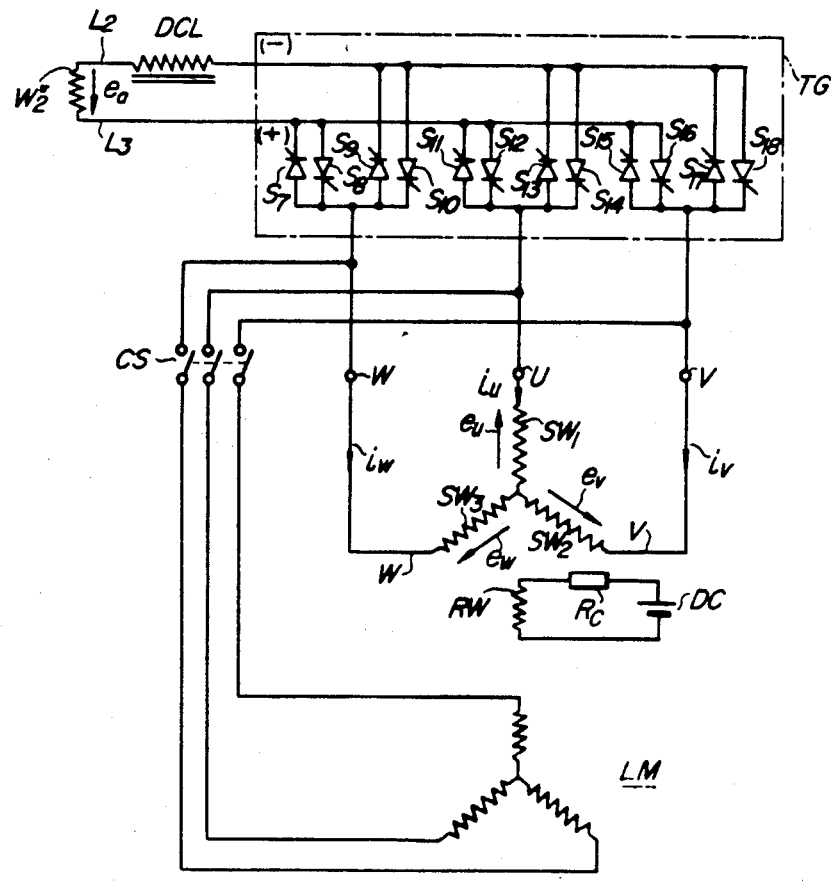
FIG. 6 is a diagram showing another example of a thyristor group.

FIG. 6 shows another embodiment of the present invention, which is similar to the arrangement shown in FIG. 1, except that no center tap is provided on the secondary winding of the main transformer Tr, the neutral line is eliminated, and the number of thyristors is made twice as great as that in FIG. 1. On the rotor side, there are shown a rotor winding RW, resistor Rc and exciting DC power source DC. Although this type of electric motor is also well known like that shown in FIG. 1, the operation thereof will be briefly described.

A torque is continuously imparted to the rotor so that the latter begins to be rotated thereby, as described above in connection with FIG. 1.

By the rotation of the rotor, the distributor is also rotated, and at this time, the thyristors $S_{12}$ and $S_{17}$ are rendered conductive for the polarity as shown in the drawing. For the reverse polarity, the thyristors $S_{14}$ and $S_{15}$ are rendered conductive. Thus, the respective thyristors are successively turned on and off so that the rotor is accelerated. In this case, too, there are obtained at the terminals U, V and W three-phase AC voltages each frequency of which corresponds to the rotational frequency of the rotor, and during the ultra-high-speed operation, the voltages are imparted to the linear motor LM to thereby enable the latter to act as nonadhesion-type drive system.

Although in both FIG. 1 and FIG. 6, the rotary machine is controlled by imparting single-phase AC power to the thyristor group, it is also possible that a DC power source may be applied to the thyristor group. In this case, the commutation with respect to each thyristor is effected only by counter electromotive force, and therefore other forced commutation means should be additionally provided at the starting point when no counter electromotive force is produced.

Although in the foregoing, description has been made of the case where the present invention is applied to acceleration, it can equally be applied in an attempt to effect braking such as regenerative braking with respect to the driving apparatus. To this end, the field polarity of the rotor is reversed, and the position of the distributor DB is changed.

We claim:
1. An electric vehicle controlling apparatus, comprising in combination:
   means for driving said vehicle at speeds lower than a predetermined speed including
      an adhesive drive system which contains
         a synchronous motor type rotary machine having a stator and a rotor, one of which has polyphase armature windings wound thereon while the other of which has field windings wound thereon,
         a control switching circuit having an input side and an output side coupled on said input side thereof to an external vehicle power source and on the output side thereof to said armature windings,
         said controlled switching circuit being controlled according to the relative position of said stator and said rotor, so as to convert an input voltage into a polyphase AC voltage, and
         a drive wheel driven by said rotary machine;
   means for driving said vehicle at speeds higher than said predetermined speed, including said adhesive drive system and a nonadhesive drive system, said nonadhesive drive system including
      a linear motor connected in parallel to said armature windings of said adhesive drive system, whereby said vehicle is driven only by said adhesive drive system at speeds lower than said predetermined speeds and is driven by said both adhesive and said nonadhesive drive systems at speeds higher than said predetermined speed.

2. An electric vehicle controlling apparatus according to claim 1, wherein said adhesive drive system further includes means for supplying single-phase AC power to said controlled switching circuit.

3. An electric vehicle controlling apparatus according to claim 1, wherein said adhesive drive system further includes a distributor, having a rotary segment thereon, connected with said rotor for rotation therewith and for supplying drive power to said drive wheel.

4. An electric vehicle controlling apparatus according to claim 3, wherein said adhesive drive system further includes a gate control circuit connected to said distributor for generating control signals to be delivered to said controlled switching circuit in response to the position of the rotary segment of said distributor.

5. An electric vehicle controlling apparatus according to claim 4, wherein said controlled switching circuit comprises a plurality of controlled thyristors, the respective input and output electrodes of which comprise the input and output sides of said switching circuit and whose control electrodes are connected to the outputs of said gate control circuit.

6. The method of operating an electric vehicle having a controlling apparatus which comprises:
   an adhesive drive system including
      a synchronous type rotary machine having a stator and a rotor, one of which has polyphase armature windings wound thereon, while the other of which has field windings wound thereon, and a distributor connected to said rotor;
      a controlled switching circuit having an input side and an output side coupled on said input side thereof to an external vehicle power source and on the output side thereof to said armature windings, said controlled switching circuit being controlled according to the relative position of said stator and said rotor, so as to convert an input voltage into a polyphase AC voltage; and
      a drive wheel driven by said distributor and said rotary machine; and
   a nonadhesive drive system having a linear motor connectable in parallel to said armature windings of said adhesive drive system, said method of operating said controlling apparatus, so as to control the speed of said vehicle comprising the steps of:
      supplying power only to said adhesive drive system at speeds below a predetermined speed and
      supplying power to both said adhesive drive system and said nonadhesive drive system at speeds above said predetermined speed, whereby said vehicle will be accelerated by the linear motor of said nonadhesive system at high speeds above said predetermined speed to thereby propel said vehicle at ultra-high speeds.

7. The method according to claim 6, wherein during ultra-high speeds, said step of controlling said adhesive drive system includes the step of operating said synchronous motor type rotary machine as a phase-advancer, so as to increase its field to thereby cause a leading current to flow in the armature windings, whereby the leading current flow will compensate the lag in current flow caused by the operation of the linear motor.

8. A method according to claim 6, wherein said step of supplying power to said adhesive drive system includes the step of:
   reversing the field polarity of said synchronous motor type rotary machine; and
   changing the position of the distributor in said synchronous motor type rotary machine.